(12) United States Patent
Friedrich

(10) Patent No.: US 7,872,567 B2
(45) Date of Patent: Jan. 18, 2011

(54) METHOD FOR TRANSPONDER ACCESS CONTROL

(75) Inventor: Ulrich Friedrich, Ellhofen (DE)

(73) Assignee: Atmel Automotive GmbH, Heilbronn (DE)

(*) Notice: Subject to any disclaimer, the term of this patent is extended or adjusted under 35 U.S.C. 154(b) by 866 days.

(21) Appl. No.: 11/481,896

(22) Filed: Jul. 7, 2006

(65) Prior Publication Data

US 2007/0008070 A1    Jan. 11, 2007

(30) Foreign Application Priority Data

Jul. 7, 2005  (DE) .................. 10 2005 032 473

(51) Int. Cl.
*H04Q 5/22* (2006.01)
*G07F 7/12* (2006.01)

(52) U.S. Cl. .................. 340/10.52; 340/10.1; 340/10.4; 340/10.5; 340/10.51; 340/5.86

(58) Field of Classification Search ................ 340/5.86, 340/10.52
See application file for complete search history.

(56) References Cited

U.S. PATENT DOCUMENTS

| 5,467,081 | A | * | 11/1995 | Drews et al. ................ 340/5.22 |
| 2004/0054900 | A1 | | 3/2004 | He |
| 2004/0066278 | A1 | | 4/2004 | Hughes et al. |
| 2005/0007236 | A1 | * | 1/2005 | Lane et al. ................. 340/5.86 |
| 2005/0231328 | A1 | * | 10/2005 | Castle et al. ............... 340/10.3 |
| 2005/0231369 | A1 | | 10/2005 | Friedrich et al. |
| 2005/0246467 | A1 | * | 11/2005 | Kim ........................... 710/301 |
| 2006/0087407 | A1 | * | 4/2006 | Stewart et al. ........... 340/10.52 |

FOREIGN PATENT DOCUMENTS

| DE | 43 42 641 A1 | 6/1995 |
| DE | 10 2005 005 436 A1 | 11/2005 |
| EP | 1 326 202 A2 | 7/2003 |

OTHER PUBLICATIONS

Oliver Berthold et al., "RFID-Technik: Verbraucherängste und Verbraucherschutz—eine Frage der Kontrolle;" Preliminary Draft; InterVal—Internet and Value Chains, Jan. 24, 2005.
Finkenzeller et al., "RFID Handbook," Fundamentals and Applictions in Contactless Smart Cards and Identification; Second Edition; Copyright 2003 John Wiley & Sons Ltd.; pp. 206-213; 126-141; and 150-165.
Knebelkamp et al., "Latest Generation Technology For Immobilizer Systems," White paper—doc center, Jan. 19, 2004, XP002267281, p. 5, lines 20-23.

* cited by examiner

*Primary Examiner*—Benjamin C Lee
*Assistant Examiner*—Andrew Bee
(74) *Attorney, Agent, or Firm*—Muncy, Geissler, Olds & Lowe, PLLC

(57) ABSTRACT

A method for transponder access control is disclosed, in which a first identification is stored in the transponder, which is transmitted to a reader unit upon appropriate request by the unit. At least one second identification and an identification selection criterion are stored in the transponder, during a request by the reader unit depending on the identification selection criterion either the first identification or the at least second identification is transmitted and, when the second identification is transmitted, access to the transponder, particularly to the first identification, is released by the transponder when the reader unit transmits a password assigned to the second identification to the transponder.

17 Claims, 2 Drawing Sheets

METHOD FOR TRANSPONDER ACCESS CONTROL

This nonprovisional application claims priority under 35 U.S.C. §119(a) on German Patent Application No. DE 102005032473, which was filed in Germany on Jul. 7, 2005, and which is herein incorporated by reference.

BACKGROUND OF THE INVENTION

1. Field of the Invention

The present invention relates to a method for transponder access control.

2. Description of the Background Art

Access control methods of this type are used, for example, in contactless identification systems or so-called Radio Frequency Identification (RFID) systems. This type of system typically includes a base station or a reader or a reader unit and a plurality of transponders or remote sensors, which are located simultaneously in the response range of the base station. The transponders or their transmitting and receiving devices typically do not have an active transmitter for data transmission to the base station. Such inactive systems are called passive systems when they do not have their own power supply and semipassive systems when they have their own power supply. Passive transponders draw the energy necessary for their supply from the electromagnetic field emitted by the base station.

For data transmission from a transponder to a base station with UHF or microwaves in the far field of the base station, so-called backscatter coupling is employed. To that end, the base station emits electromagnetic carrier waves, which are modulated and reflected by the transmitting and receiving device of the transponder by a modulation method in accordance with the data to be transmitted to the base station. The typical modulation methods for this are amplitude modulation, phase modulation, and amplitude shift keying (ASK) subcarrier modulation, in which the frequency or the phase position of the subcarrier is modified.

An access control method for transponders is described in the standards proposal ISO/IEC_CD 18000-6C of 7 Jan. 2005. The transponder in this case is first selected in a selection or arbitration process from a number of transponders. The described selection process is a stochastic process in the form of a slot-based ALOHA protocol. Selection methods of this kind are described in detail, for example, in the handbook by Klaus Finkenzeller, RFID-Handbuch [RFID Handbook], 3$^{rd}$ ed., HANSER, 2002.

When the transponder is chosen or selected or singled out, the reader unit transmits a request to the transponder in the form of a retransmission of a random number previously transmitted by the transponder within the scope of the arbitration process, whereupon the transponder transmits protocol control bits (PC) and an identification in the form of an electronic product code (EPC) to the reader unit. The protocol control bits contain information on a physical layer of the transmission path. The identification or the electronic product code EPC represents inter alia a product tagged with the transponder. The assignment of an EPC to the tagged product is standardized, so that the product can be inferred from the EPC information. Furthermore, the EPC can be used by the reader unit as a pointer to other information, for example, to a password assigned to the EPC. The password can then be used to block memory areas in the transponder for write accesses.

The transmission of the EPC upon request to the reader unit holds certain risks, however. Thus, during transport of products unauthorized persons can search selectively for products of a certain type, for example, high-quality watches or weapons, because the product-identifying EPC is transmitted unprotected. To accomplish this, it is only necessary to bring a suitable reader into the range of the transponders, for example, in a highway parking area or train stations.

After the transmission of the PC and EPC by the transponder, read and/or write access to memory areas within the transponder is possible through the reader unit, unless the specific areas are blocked or locked for write access. Furthermore, read access to passwords can also be barred. Despite a possible read blocking of passwords, there is some security risk that unauthorized persons have access to perhaps private memory contents.

When the transponder is used in so-called chip cards, personal data may be stored as memory contents. It is desirable here as well to regulate access to these data, for example, so that upon entry into a store it cannot be determined automatically by reading the memory contents whether the particular customer still has funds on the chip card.

SUMMARY OF THE INVENTION

It is therefore an object of the present invention to provide a method for access control to, for example, a passive and/or backscatter-based transponder. The method reliably preventing unauthorized access to the memory area of the transponder, particularly to the EPC, and is simultaneously compatible with the aforementioned ISO standards proposal.

For this purpose, at least one second identification and an identification selection criterion are stored in the transponder, during the request by the reader unit depending on the identification selection criterion either the first identification or the at least second identification is transmitted and, when the second identification is transmitted, a read and/or write access to the transponder, particularly to the first identification, is released by the transponder only when the reader unit transmits a password assigned to the second identification to the transponder.

The release of the access can extend to a mere read authorization of only individual, settable areas of a transponder memory or a sensor value or, in the case of maximum access authorization, relate to read and write authorization of all memory areas or sensors and actors, if present, of the transponder. Because the transponder transmits an identification independent of the value of the identification selection criterion, the method of the invention is basically standard-compatible. If the identification selection criterion is adjusted or set in such a way that the second identification is sent by the transponder, the sending of the first identification is suppressed. If the first identification contains security-relevant information and the second identification is only a pointer or a reference to information, which has no value for an unauthorized user, thereby unauthorized access to the transponder or to its memory areas or sensor information, whether read or write, can be effectively prevented. An authorized user can use the second identification as a pointer or reference to a password they know, assigned to the second identification, and by sending this password to the transponder release the access. If the identification selection criterion is adjusted or set in such a way that the first identification is sent by the transponder, the transponder can also be used in conventional systems that do not support the access method of the invention.

In a further embodiment of the method, the first identification maps a product tagged with the transponder. The first identification in this case can be the EPC in particular. This enables effective protection of the EPC from unauthorized access, whereas authorized users are given access to the EPC by entering the password assigned to the second identification.

In a further embodiment of the method, the second identification and/or the identification selection criterion can be set during operation of the transponder, after the reader unit transmits the password assigned to the second identification to the transponder. This makes possible a simple changing of the second identification, for example, when products tagged with the transponder are exchanged or modified.

In a further embodiment of the method, a password is assigned to the first identification, whereby a change in the first identification and/or a release or blocking of the memory areas for read and/or write access of the transponder can be made only after the password assigned to the first identification is transmitted to the transponder. A second access level is created in this way, which can be accessed with an activated second identification only after the password assigned to the second identification is entered. A larger group of people, for example, can be given access by means of the second identification in this way, whereby only a narrowly limited group of people have the first identification or its associated password, who, moreover, can perform accessible, highly security-relevant operations.

in a further embodiment of the method, the password assigned to the first identification and/or the password assigned to the second identification are each assigned an associated public password, whereby the particular password and the associated public password are clearly assigned to one another by means of a cryptographic algorithm. This type of assignment is described, for example, in German patent application DE 102005005436.6, which corresponds to U.S. Publication No.: US2005231369, and which is incorporated herein by reference. The specific public password can also be written in the transponder in this manner via a not tap-proof radio communication and there, for example, not blocked or read-locked or encrypted, merely stored in the memory. Because the private password cannot be calculated or calculated only with very great effort from the public password and "unlocking" with the help of the public password is not possible, password assignment or password storage is considerably simplified. The cryptographic algorithm can be realized, for example, by a linear feedback shift register, at whose input the private password or a bit sequence derived from it is applied, whereby the public password is waiting at a settable stage of the shift register or is output as a bit sequence. Further, at least one parameter of the cryptographic algorithm can be stored in a rewritable, nonvolatile memory of the transponder. The parameter, for example, can be a type of cryptographic algorithm and/or a level indication at which the public password is applied when a linear feedback shift register is used to realize the cryptographic algorithm.

In a further embodiment of the method, the first identification, the second identification, a public password assigned to the first identification, and/or the public password assigned to the second identification can be stored in a nonvolatile memory of the transponder.

In a further embodiment of the method, the second identification can be stored in a memory area allocated to the first identification together with the first identification. In ISO/IEC_CD 18000-6C of 7 Jan. 2005, the physical memory of the transponder is divided into four logical areas or banks. Here, the EPC, i.e., in this case the first identification, is allocated its own area, protocol control bits PC and a CRC also being stored in the area. The length, i.e., the number of bits, of the EPC can be adjusted hereby. If the memory area is not completely occupied by the EPC, PC, and CRC, it is available for storing the second identification. The public password assigned to the second identification can be stored in the memory area allocated to the first identification together with the first identification and the second identification. This is sensible when memory space is still available in the area.

In a further embodiment of the method according to claim 10, the transponder is permanently deactivated when the reader unit transmits a kill password to the transponder, the kill password being stored in a transponder memory area allocated to it: The transmission of the kill password to the transponder, typically in combination with an associated command, causes the transponder to be deactivated permanently. Read or write access to it is then no longer possible. This is carried out, for example, for data protection reasons when a product labeled by the transponder is scrapped.

In ISO/IEC_CD 18000-6C of 7 Jan. 2005, a separate logical area in the physical memory of the transponder is provided for password storage, both the kill password and a password assigned to the first identification being stored here. The public password assigned to the second identification can thus be stored in the memory area allocated to the kill password when the kill password is deactivated. Good memory utilization can be achieved in this manner.

In a further embodiment of the method, the identification selection criterion can be stored as a bit value in a nonvolatile memory of the transponder. Here, for example, a logical bit value "0" of the identification selection criterion can indicate a deactivated second identification and a logical bit value "1" an activated second identification.

In a further embodiment of the method, a number of faulty transmissions of the password assigned to the second identification can be counted in the transponder and when a settable counter threshold is reached, a clock supply of the transponder is deactivated. The entire transponder is deactivated by deactivating the clock supply or an oscillator; i.e., access to the transponder is no longer possible. Reactivation of the transponder or its clock supply can be achieved, for example, by removing it so far from an electromagnetic field emitted by the reader unit that the power drawn from the field is no longer sufficient for its supply. If it is then again brought into the field, a so-called power-on-reset occurs, as a result of which access to the transponder is again possible.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
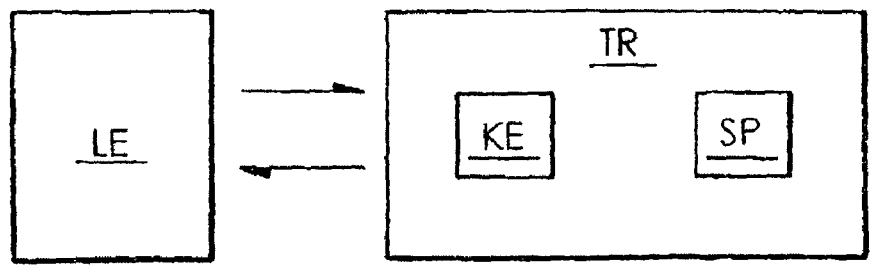
FIG. 1 is a block diagram of an RFID system with a reader unit and a transponder.

FIG. 1 illustrates a block diagram of an RFID system with a reader unit LE and a passive backscatter-based transponder TR, which are each configured such that in their basic functions they operate, for example, in conformity with ISO/IEC_CD 18000-6C of 7 Jan. 2005. The transponder TR comprises a nonvolatile memory SP and a cryptography unit KE, in addition to other conventional functional units (not shown).

Figure 2:
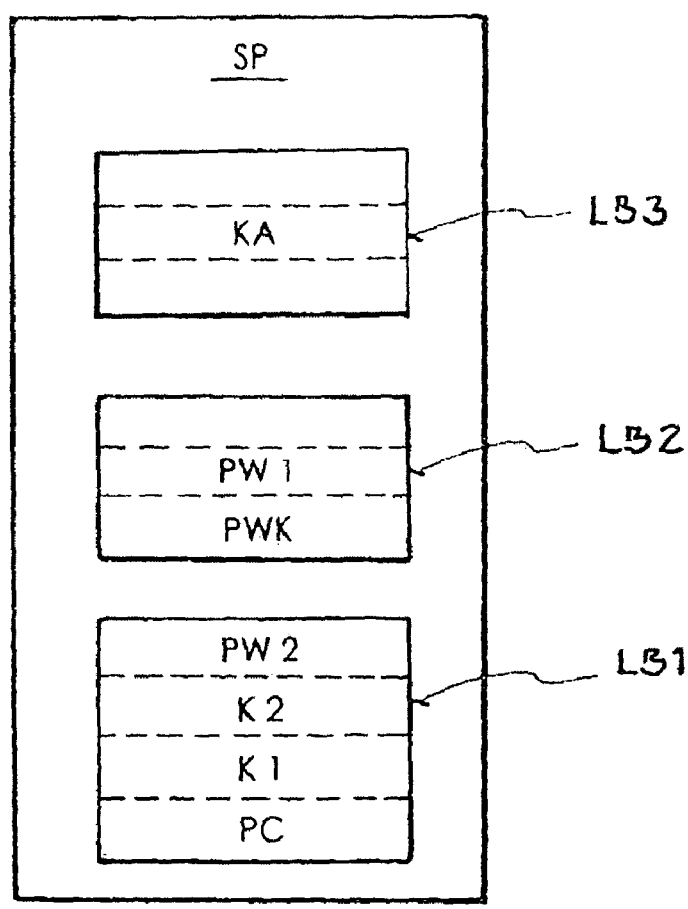
FIG. 2 is a memory map of the transponder shown in FIG. 1.

FIG. 2 shows a memory map of the memory SP of the transponder TR as shown in FIG. 1. The physical memory SP is divided into logical areas LB1 to LB3, which are used as an address specification or index during memory access by the reader unit LE to the transponder TR. In addition to the indicated areas, further areas may be provided, which are not shown here.

The logical area LB1 is used to store a first identification K1 in the form of an electronic product code EPC, a second identification K2, and protocol control bits PC. The logical area LB2 is used to store a public password PW1, assigned to the first identification K1, and a so-called kill password PWK. The kill password PWK is used to deactivate the transponder TR permanently for data protection reasons, for example, when a product tagged with the transponder TR is scrapped, i.e., to block read and write access permanently. The area LB3, which forms a user memory for storing user-specific data, contains an identification selection criterion KA in the form of a settable bit value. The first identification is selected if the bit value is "1" and the second identification if the bit value is "0."

A public password PW2 assigned to the second identification K2 can be stored in area LB2 and/or in area LB1. In the shown embodiment, password PW2 is stored in area LB1, because the kill password PWK and an associated kill functionality are activated. When the kill functionality is deactivated, however, i.e., no kill password PWK is required, it is also possible to store password PW2 in memory area LB2 of the kill password PWK.

The cryptography unit KE performs a cryptographic algorithm, which generates an output bit sequence corresponding to the associated public password PW1 or PW2, from a private password received by the transponder TR. In a password operation, the reader unit LE first transmits the private password to the transponder TR, whereupon the transponder generates an associated input bit sequence for the cryptography unit KE. The cryptography unit KE transforms the input bit sequence into an output bit sequence, which is compared with the public password PW1 or PW2 stored in the transponder TR. Only when the public password PW1 or PW2 and the output bit sequence generated by the cryptography unit KE agree is the password input successful and an appropriate access release occurs. Because the cryptographic algorithm is virtually irreversible—i.e., the associated private password cannot be determined from knowledge of the public password PW1 or PW2,—this type of method is secure against unauthorized access. The cryptography unit KE comprises a linear feedback shift register (not shown), whereby the output bit sequence waits at a specific, settable register step of the shift register. The cryptography unit KE can be deactivated; i.e. the public password and private password then agree. This is appropriate, for example, when transponders are used in systems which do not support this type of encryption.

The public passwords PW1 and PW2 can be activated, for example, by transmitting and then storing these passwords in the transponder TR. This is possible, however, only until a valid password is established or transmitted for the first time. If it is agreed, for example, that with a valid public password in binary notation at least one bit should have a value of "1," activation can occur simultaneously by sending a valid password and subsequent storage. After activation, the password can be changed only after the old password is entered. To change the password PW1, first the private password belonging to password PW2 must be entered in addition before the private password belonging to password PW1 can be entered.

Figure 3:
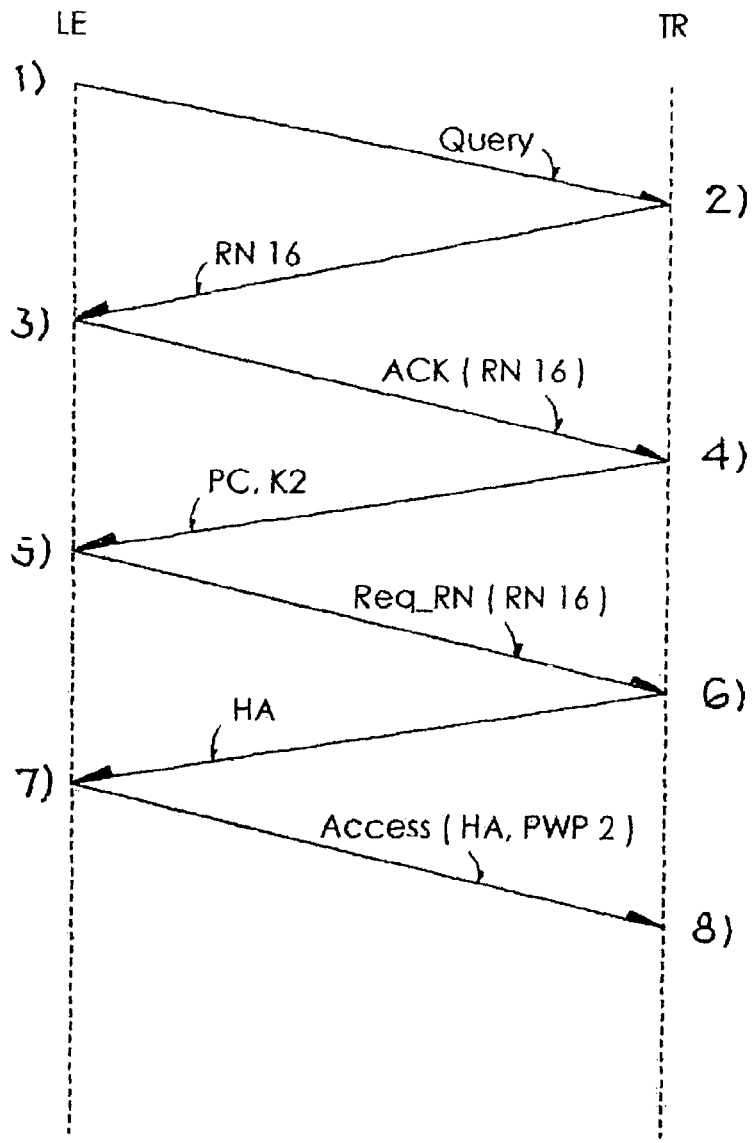
FIG. 3 is a sequence diagram of an access by the reader unit shown in FIG. 1 to the transponder.

FIG. 3 shows a sequence diagram of an access by the reader unit LE to the transponder TR, when the identification selection criterion KA for selecting the second identification K2 is set, i.e., when the associated bit value is "0."

Access is initiated by a selection process. The selection process is a conventional slot-based ALOHA protocol. To initiate the selection process, the reader unit LE sends a so-called query command to the transponder TR. When a transponder-internal slot counter has a value of zero, the transponder TR sends an internally generated 16-bit random number RN16 to the reader unit LE.

The random number RN16 is received by the reader unit LE. The reader unit thereupon sends a request in the form of a so-called ACK command to the transponder TR, which command contains the received random number RN16 as a command parameter.

The transponder TR receives the ACK command and the random number contained therein and checks whether the random number RN16 it sent agrees with the received random number. If the random numbers do not agree, the transponder TR does not respond to the request or the received ACK command. In the case of agreement, the transponder TR checks its identification selection criterion KA and because in the indicated case the second identification K2 is selected, sends the second identification K2 and protocol control bits PC to the reader unit LE. The protocol control bits PC contain information on a physical layer of the transmission path. In the indicated exemplary embodiment, the protocol control bits PC are assigned to the first identification K1. It is also possible, however, to introduce another set of protocol control bits, which are assigned exclusively to the second identification.

The reader unit LE receives the second identification K2 and the protocol control bits PC. The second identification K2 is used as reference for a private password PWP2 assigned to the second identification. When the reader unit LE is operated by an authorized user and, for example, contains a database with an assignment "identification to password," it determines with the help of the database and the second identification the associated private password PWP2 belonging to the public password PW2.

The reader unit LE now sends a Req_RN command, which contains the previously received random number as a parameter.

The transponder TR receives the Req_RN commands and the random number contained therein. When the received random number agrees with the random number RN16, the transponder TR transmits a so-called handle HA to the reader unit LE, which uses this handle in subsequent accesses as a parameter that indicates an existing, i.e., valid, connection. If the random numbers do not agree, there is no reaction by the transponder. The sending of the Req_RN command and the return of the handle HA are optional.

The reader unit now sends a so-called access command, which contains the private password PWP2 and the handle HA as parameters.

The transponder TR receives the access command and first checks whether a valid handle HA was received. If this is not the case, the received access command is ignored. If there is a valid handle HA, the received private password PWP2 is converted to a bit sequence, which is entered into the cryptography unit KE as an input bit sequence. The output bit sequence of the cryptography unit KE is compared with the public password PW2 stored in area LB1. If the output bit sequence and the password PW2 agree, read and write access to the transponder TR is possible after this point in time. In the case of non-agreement, no read and write access is possible. This prevents, for example, the first identification K in the form of a product label from being read out when the reader unit LE is operated by an unauthorized user.

The identification selection criterion KA and the second password PW2 or PWP2 can be changed by a user during the operation of the transponder TR. For this purpose, first the old private password PWP2 is transmitted to the transponder TR together with an access command. Next, the new password or a new value of the identification selection criterion KA is transmitted to the transponder together with an appropriate command.

The first public password PW1 or a private password PWP1 assigned to it is used for blocking or unblocking write accesses to certain memory areas of the transponder. Such operations are usually undertaken only by a privileged group of people.

The request for initiating identification transmission by the transponder TR is transmitted to the transponder TR in the form of an ACK command in the shown embodiment. When the transponder alternatively or additionally also functions according to the so-called reader-talks-first-principle, a request can also be effected implicitly in that the transponder enters a response range of the reader unit LE and thus is supplied with voltage by an electromagnetic field emitted by the reader unit.

The transmission of the private passwords PWP1 or PWP2 can occur optionally in an encrypted manner. For example, the random number RN16 transmitted by the transponder can be used for this purpose, which virtually cannot be tapped by an "attacker" attempting to tap the data traffic, because of the minimal signal strengths, due to the backscatter operation, of the backscattered signal. The reader unit then performs an XOR operation with the private password PWP1 or PWP2 to be sent and the random number RN16. A decryption occurs in the transponder again by executing an XOR operation with the received, encrypted private password PWP1 or PWP2 and the random number RN16.

In the shown exemplary embodiment, a stochastic selection procedure is performed for a transponder selection in the form of the slot-based ALOHA protocol. Of course, instead of this, a deterministic selection procedure can also be performed, which can be followed after the selection by the described access-controlling steps.

The indicated method for access control effectively prevents unauthorized access to memory areas of the transponder TR, particularly to the first identification or the EPC, and is simultaneously compatible with the aforementioned ISO standards proposal.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for access control to a transponder, in which a first identification is stored in the transponder, the method comprising the steps of:
    storing at least one second identification, which is a pointer to the first identification, in the transponder;
    storing an identification selection criterion in the transponder, a value of the identification selection criterion being settable;
    transmitting to a reader unit, upon a request by the reader unit, based on the value of the identification selection criterion, either the first identification or the at least one second identification; and
    when the at least one second identification is transmitted, releasing access to the first identification of the transponder only when the reader unit transmits a first password, which is assigned to the at least one second identification, to the transponder.

2. The method according to claim 1, wherein the first identification identifies a product tagged with the transponder.

3. The method according to claim 1, wherein the at least one second identification and/or the identification selection criterion is set during operation of the transponder, after the reader unit transmits the first password assigned to the at least one second identification to the transponder.

4. The method according to claim 1, wherein a second password is assigned to the first identification, whereby a change in the first identification and/or a release or blocking of the memory areas for read and/or write access of the transponder is made after the second password assigned to the first identification is transmitted to the transponder.

5. The method according to claim 4, wherein the second password assigned to the first identification and/or the first password assigned to the at least one second identification are each assigned an associated public password, whereby the first and second passwords and the associated public passwords are assigned to one another on the basis of a cryptographic algorithm.

6. The method according to claim 5, wherein at least one parameter of the cryptography algorithm is stored in a rewritable, nonvolatile memory of the transponder.

7. The method according to claim 1, wherein the first identification, the at least one second identification, a public password assigned to the first identification, and/or a public password assigned to the at least one second identification are stored in a nonvolatile memory of the transponder.

8. The method according to claim 7, wherein the at least one second identification is stored with the first identification in a memory area allocated to the first identification.

9. The method according to claim 8, wherein the public password assigned to the at least one second identification is stored in the memory area allocated to the first identification together with the first identification and the at least one second identification.

10. The method according to claim 1, wherein the transponder is deactivated, when the reader unit transmits a kill password to the transponder, the kill password being stored in a memory area of the transponder.

11. The method according to claim 10, wherein the public password assigned to the second identification is stored in the memory area allocated to the kill password when the kill password is deactivated.

12. The method according to any claim 1, wherein the identification selection criterion is stored as a bit value in a nonvolatile memory of the transponder.

13. The method according to claim 1, wherein a number of faulty transmissions of the first password assigned to the at least one second identification is counted in the transponder and when a settable counter threshold is reached, a clock supply of the transponder is deactivated.

14. The method according to claim 1, wherein the transponder is a passive and/or backscatter-based transponder.

15. The method according to claim 1, wherein, when access to the transponder is released, the first identification is accessible.

16. The method according to claim 10, wherein, upon receipt of the kill password, the transponder is permanently deactivated.

17. A transponder comprising:
- a first memory area for storing a first identification, the first identification identifying a product associated with the transponder; and
- a second memory area for storing a second identification, which is a pointer to the first identification,
- a cryptographic unit wherein after a request by a reader unit, the second identification is provided to the reader unit, and access to the first identification is provided upon transmission by the reader unit and receipt by the transponder of a private password that is associated with the second identification, wherein said private password is input to said cryptographic unit, and wherein the association of the private password with the second identification is determined by an output of said cryptographic unit.

* * * * *